United States Patent
Hayashi (10) Patent No.: US 8,561,173 B2
(45) Date of Patent: Oct. 15, 2013

(54) AUTHENTICATION PROCESSING APPARATUS, AUTHENTICATION PROCESSING METHOD, RECORDING MEDIUM STORING AUTHENTICATION PROCESSING PROGRAM, RECORDING MEDIUM STORING INFORMATION PROCESSING PROGRAM AND INFORMATION PROCESSING SYSTEM

(75) Inventor: Ryotaro Hayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1367 days.

(21) Appl. No.: 12/055,383

(22) Filed: Mar. 26, 2008

(65) Prior Publication Data

US 2008/0250495 A1 Oct. 9, 2008

(30) Foreign Application Priority Data

Apr. 5, 2007 (JP) ................................ 2007-099083

(51) Int. Cl.
*G06F 7/04* (2006.01)
(52) U.S. Cl.
USPC .................... 726/21; 726/4; 726/17; 713/170
(58) Field of Classification Search
USPC .................................. 726/4, 17, 21; 713/170
See application file for complete search history.

(56) References Cited

U.S. PATENT DOCUMENTS

| | | | | |
|---|---|---|---|---|
| 5,469,576 A * | 11/1995 | Dauerer et al. | ..................... | 726/2 |
| 5,774,551 A * | 6/1998 | Wu et al. | ........................ | 713/155 |
| 5,884,312 A * | 3/1999 | Dustan et al. | .......................... | 1/1 |
| 6,845,453 B2 * | 1/2005 | Scheidt et al. | ..................... | 726/5 |
| 6,976,017 B1 * | 12/2005 | Getchius | ........................ | 707/758 |
| 7,134,137 B2 * | 11/2006 | Joshi et al. | ......................... | 726/1 |
| 7,849,498 B2 * | 12/2010 | Royer et al. | ...................... | 726/2 |
| 2005/0015601 A1 * | 1/2005 | Tabi | .............................. | 713/182 |

FOREIGN PATENT DOCUMENTS

| | | |
|---|---|---|
| JP | 09-035030 A | 2/1997 |
| JP | 2004-005273 A | 1/2004 |

* cited by examiner

*Primary Examiner* — April Y Blair
(74) *Attorney, Agent, or Firm* — Sughrue Mion, PLLC (57) ABSTRACT

An authentication processing apparatus, which includes: an authentication processing section that performs authentication using an authentication method selected from authentication methods provided; a storage section that stores authentication information indicating whether or not the authentication succeeds; a determination section that, when an operation on electronic information associated to one or more authentication methods is performed, determines whether the operation on the electronic information is permitted or not, on the basis of the one or more authentication methods associated to the electronic information and the stored authentication information; and an authentication request section that, when the determination section determines that the operation on the electronic information is not permitted, detects from among the one or more authentication methods associated to the electronic information an authentication methods for which it is not indicated in the authentication information that an authentication succeeds, and requests the authentication using the detected authentication method.

14 Claims, 11 Drawing Sheets

| USER IDENTIFIER | AUTHENTICATED AUTHENTICATION MANNER |
|---|---|
| USER A | PASSWORD |
| | PERSONAL CERTIFICATE |

FIG.3

| OBJECT IDENTIFIER | REQUEST AUTHENTICATION MANNER | ACCESS AUTHORITY LIST | |
|---|---|---|---|
| OBJECT 1 | PASSWORD | USER A | READING |
| | | USER B | READING, EDITING |
| OBJECT 2 | PASSWORD+PERSONAL CERTIFICATE | USER A | READING, EDITING |
| | | USER C | EDITING |

| USER IDENTIFIER | AUTHENTICATED AUTHENTICATION MANNER | EXPIRY DATE |
|---|---|---|
| USER A | PASSWORD | 2007/03/03/08:16 |
| | PERSONAL CERTIFICATE | 2007/03/03/12:03 |

| USER IDENTIFIER | REQUEST AUTHENTICATION MANNER |
|---|---|
| USER A | PASSWORD |
| USER B | PASSWORD+PERSONAL CERTIFICATE |

FIG.10A

| TYPE OF ACCESS | REQUEST AUTHENTICATION MANNER |
|---|---|
| READING | PASSWORD |
| READING, EDITING | PASSWORD+PERSONAL CERTIFICATE |

FIG.10B

| ACCESS AUTHORITY LIST | | REQUEST AUTHENTICATION MANNER |
|---|---|---|
| USER A | READING | PASSWORD |
| USER B | READING, EDITING | |
| USER A | READING, EDITING | PASSWORD+PERSONAL CERTIFICATE |
| USER C | EDITING | |

FIG.10C

| OBJECT IDENTIFIER | REQUEST AUTHENTICATION MANNER | ACCESS AUTHORITY LIST | |
|---|---|---|---|
| OBJECT 1 | PASSWORD | USER A | READING |
| | PASSWORD+PERSONAL CERTIFICATE | USER B | READING, EDITING |
| OBJECT 2 | PASSWORD+PERSONAL CERTIFICATE | USER A | READING, EDITING |
| | PASSWORD+FINGERPRINT | USER C | EDITING |

| AUTHENTICATION MANNER | AUTHENTICATION LEVEL |
|---|---|
| PASSWORD | 1 |
| PERSONAL CERTIFICATE | 2 |
| FINGERPRINT | 3 |
| PASSWORD+PERSONAL CERTIFICATE | 3 |
| PASSWORD+PERSONAL CERTIFICATE+FINGERPRINT | 7 |

FIG.12

| OBJECT IDENTIFIER | REQUEST AUTHENTICATION LEVEL | ACCESS AUTHORITY LIST | |
|---|---|---|---|
| OBJECT 1 | 1 | USER A | READING |
| | | USER B | READING, EDITING |
| OBJECT 2 | 3 | USER A | READING, EDITING |
| | | USER C | EDITING |

FIG.13

| OBJECT IDENTIFIER | REQUEST AUTHENTICATION LEVEL | ACCESS AUTHORITY LIST | |
|---|---|---|---|
| OBJECT 1 | 1 | USER A | READING |
| | 3 | USER B | READING, EDITING |
| OBJECT 2 | 3 | USER A | READING, EDITING |
| | 2 | USER C | EDITING |

FIG.14

AUTHENTICATION PROCESSING APPARATUS, AUTHENTICATION PROCESSING METHOD, RECORDING MEDIUM STORING AUTHENTICATION PROCESSING PROGRAM, RECORDING MEDIUM STORING INFORMATION PROCESSING PROGRAM AND INFORMATION PROCESSING SYSTEM

CROSS-REFERENCE TO RELATED APPLICATION

This application is based on and claims priority under 35 USC 119 from Japanese Patent Application No. 2007-099083 filed on Apr. 5, 2007.

BACKGROUND

1. Technical Field

The present invention relates to an authentication processing apparatus, an authentication processing method, a recording medium storing an authentication processing program, a recording medium storing an information processing program and an information processing system.

2. Related Art

When electronic information stored in a system or a process provided by a system is utilized, authentication may be performed in order to verify that the user has a right to utilize the electronic information or the process. As manners of such authentication, plural manners including those of authentication by password, authentication by personal certificate, biometric authentication using biometrics information, such as a fingerprint, have been realized.

SUMMARY

An aspect of the present invention provides an authentication processing apparatus, which includes: an authentication processing section that performs authentication using an authentication method selected from a plurality of authentication methods provided; a storage section that stores authentication information indicating whether or not the authentication succeeds; a determination section that, when an operation on electronic information associated to one or more authentication methods is performed, determines whether the operation on the electronic information is permitted or not, on the basis of the one or more authentication methods associated to the electronic information and the authentication information stored in the storage section; and an authentication request section that, when the determination section determines that the operation on the electronic information is not permitted, detects from among the one or more authentication methods associated to the electronic information an authentication methods for which it is not indicated in the authentication information that an authentication succeeds, and requests the authentication using the detected authentication method.

BRIEF DESCRIPTION OF THE DRAWINGS

Exemplary embodiments of the present invention will be described in detail based on the following figures, wherein.

DETAILED DESCRIPTION

Hereinbelow, exemplary embodiments of the authentication processing apparatus, the authentication processing method, the recording medium storing the authentication processing program, the recording medium storing the information processing program and the information processing system pertaining to the present invention will be described in detail with reference to the attached drawings.

First Example

Figure 1:
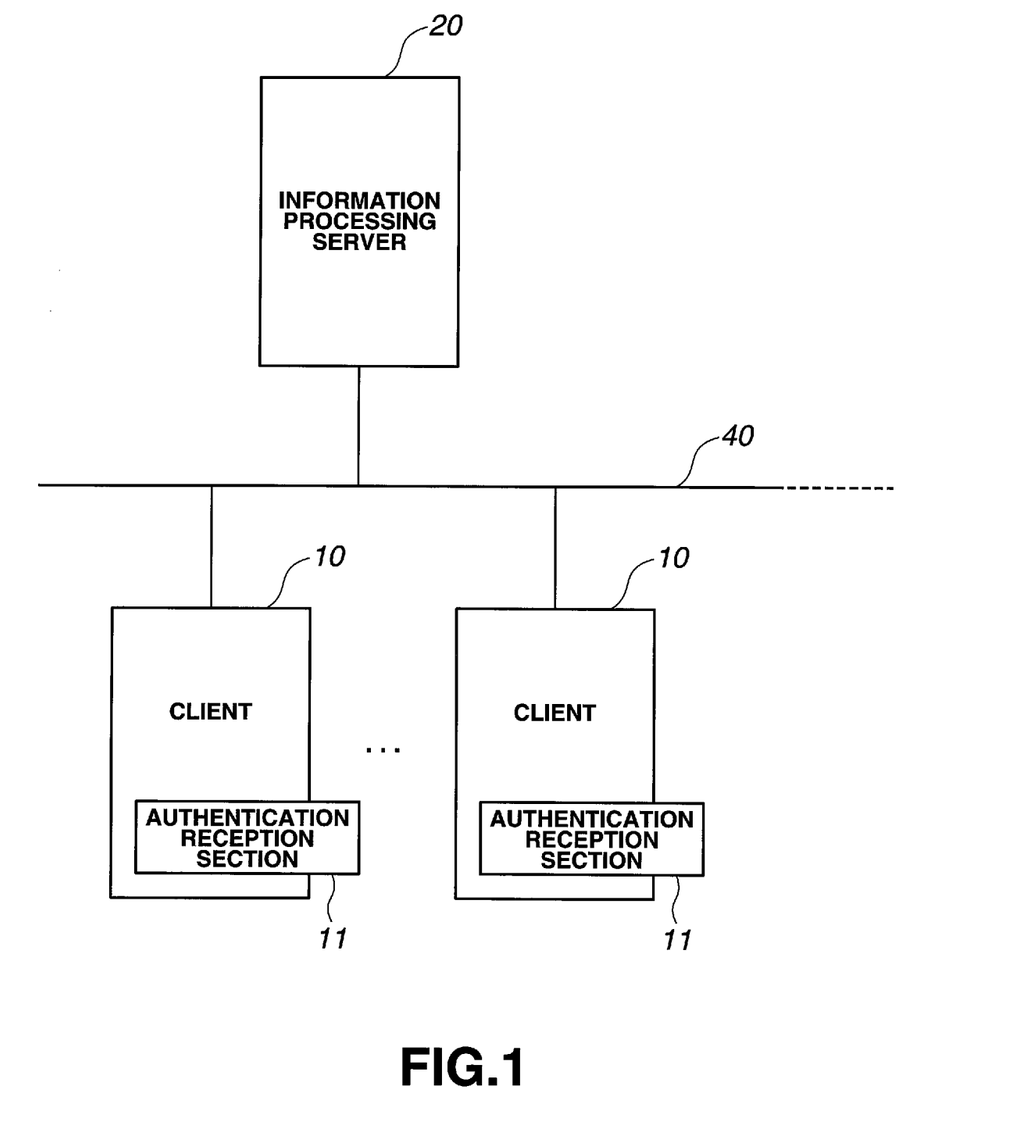
FIG. 1 is a figure showing one example of the entire configuration of the authentication processing system pertaining to one embodiment of the present invention.

FIG. 1 is a figure showing one example of the entire configuration of the authentication processing system pertaining to one exemplary embodiment of the present invention.

In this authentication processing system, a client 10 and an information processing server 20 are connected to each other through a network 40 made up of an LAN (Local Area Network), a WAN (Wide Area Network), or the like. In FIG. 1, plural clients 10 are connected to one information processing server 20, but the configuration is not limited to this, plural information processing servers 20 may be provided, or only one client 10 may be given.

The client 10 is utilized for accessing an information object managed by the information processing server 20, and the information object is used. Types of purpose of accessing the information object include requests for reading, editing, deleting, printing, and the like.

With the client 10, after log in to the information processing server 20, the access to the information object managed by the information processing server 20 is performed. Whether the information object is accessible or not is determined on the basis of the authentication manner, the combination of plural authentication or the like, used at the time of logging in or an additional authentication.

An authentication reception section 11 that receives authentication information inputted from the user is provided in the client 10. The authentication information includes, for example, information having the logged-in name and the password in a case of password authentication; information having a personal certificate issued by a third-party agency or the like, for authentication by personal certificate; or information including fingerprint image data obtained by imaging a fingerprint for fingerprint authentication.

The information processing server 20 carries out processing including management of the information objects, authentication of the user, and control of access to the information object. Herein, a part of an example of the functional configuration of the information processing server 20 will be described with reference to FIG. 2.

Figure 2:
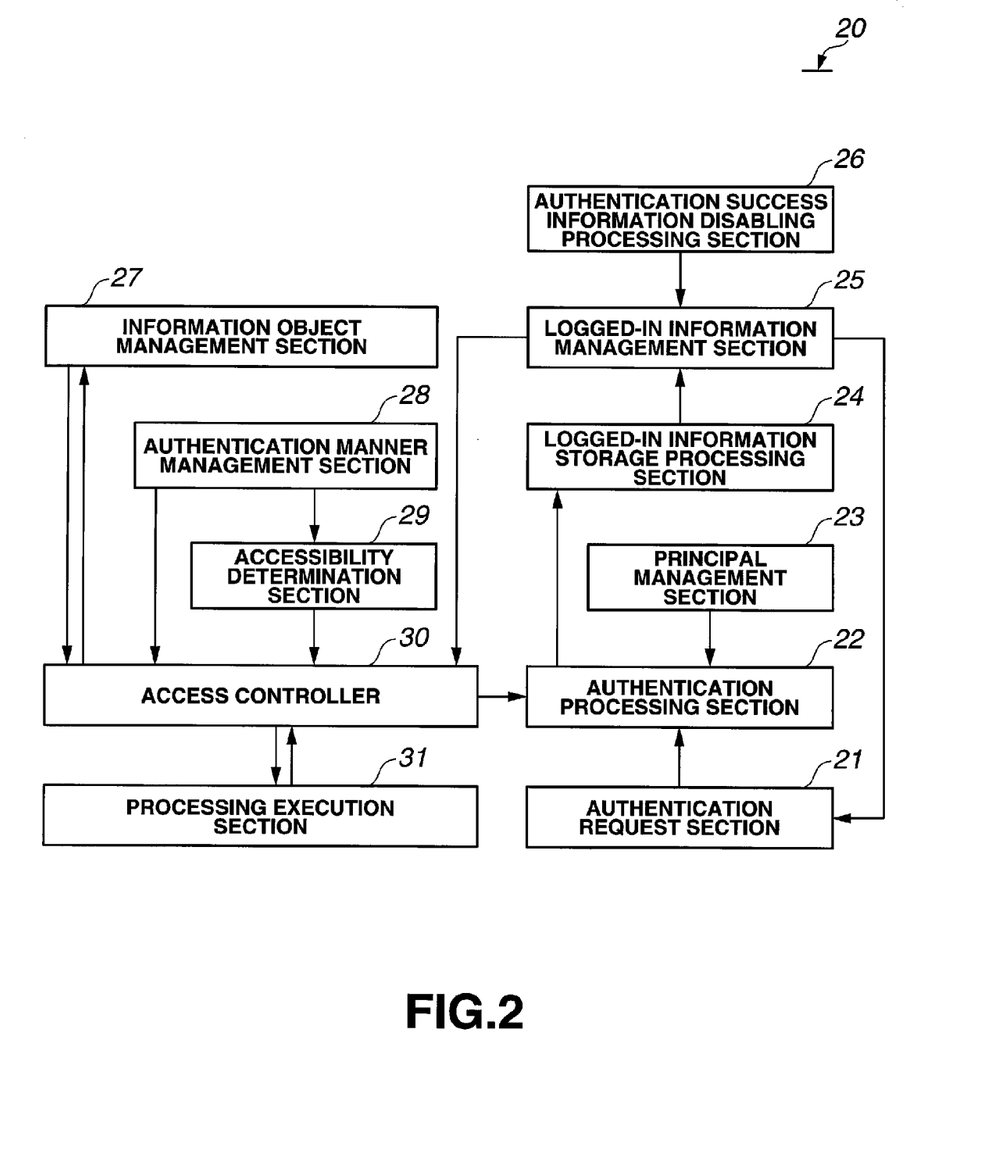
FIG. 2 is a figure showing a part of an example of the functional configuration of the information processing server 20 as shown in FIG. 1.

As the functional configuration, the information processing server 20 includes an authentication request section 21, an authentication processing section 22, a principal management section 23, a logged-in information storage processing section 24, a logged-in information management section 25, an authentication success information disabling processing section 26, an information object management section 27, an authentication manner management section 28, an accessibility determination section 29, an access control section 30, and a processing execution section 31.

The authentication request section 21 performs the function of requesting authentication from the user. The request for authentication is performed at the time of login, the additional authentication or the like. The request for authentication by the authentication request section 21 is performed by, for example, displaying a dialog, or the like, requesting for authentication on the screen.

The authentication processing section 22 performs the function of authenticating the user. The authentication processing section 22 supports authentication in plural authentication manners, and the user selects one or more authentication manners from the pertinent plural authentication manners for making authentication. The authentication in the authentication processing section 22 is performed by checking whether the authentication information sent from the client 10 and the later described information managed by the principal management section 23 match or not.

The principal management section 23 performs the function of managing the information used for authentication. For example, the information used for checking the authenticity at the time of password authentication provides the logged-in name, the regular password corresponding to the authorized logged-in name, and the like.

Figure 3:
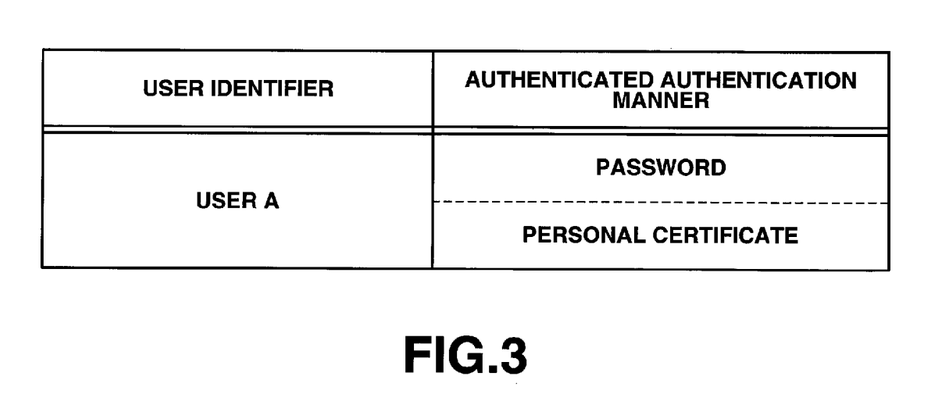
FIG. 3 is a figure showing one example of the table configuration of a logged-in information management table.

The logged-in information management section 25 performs the function of storing the logged-in information and managing it. For management of the logged-in information, a logged-in information management table as shown in FIG. 3, for example, is used. In the logged-in information management table, the authenticated authentication manner is managed in correspondence with the user identifier giving information for identifying the user. In addition, as the authenticated authentication manner, one or more pieces of authentication success information indicating the authentication manner that is used for authentication and in which the authentication succeeds are managed. In this case, the information about the user A who succeeds in authentication by using password and personal certificate is managed as the logged-in information. In a case where the user logs out, the logged-in information which is managed by the logged-in information management section 25 is disabled.

The logged-in information storage processing section 24 performs the function of causing the above-described logged-in information management section 25 to store the logged-in information. In other words, the authentication success information indicating the authentication manner that is used for authentication and in which the authentication succeeds, and the logged-in information corresponding to the user identifier of the user who succeeds in authentication is stored in the above-described logged-in information management table.

The authentication success information disabling processing section 26 performs the function of disabling the authentication success information. For the authentication success information disabling processing section 26 in First Example, an example where the authentication success information is disabled by deleting the authentication success information will be described. However, it may be possible that the authentication success information is disabled by turning on or off the flag or the like, indicating whether the authentication success information is enabled or disabled, rather than deleting the authentication success information itself.

The information object management section 27 performs the function of storing and managing various information objects. The information object applies to general electronic information, including electronic documents, images, still pictures, animations, music, and voices. In First Example, the information object management section 27 is provided as one of the functional components of the information processing server 20, and the information object is managed within the server. However, the configuration is not limited to this, and the information object may be managed by memory means or the like, provided outside of the information processing server 20.

Figure 4:
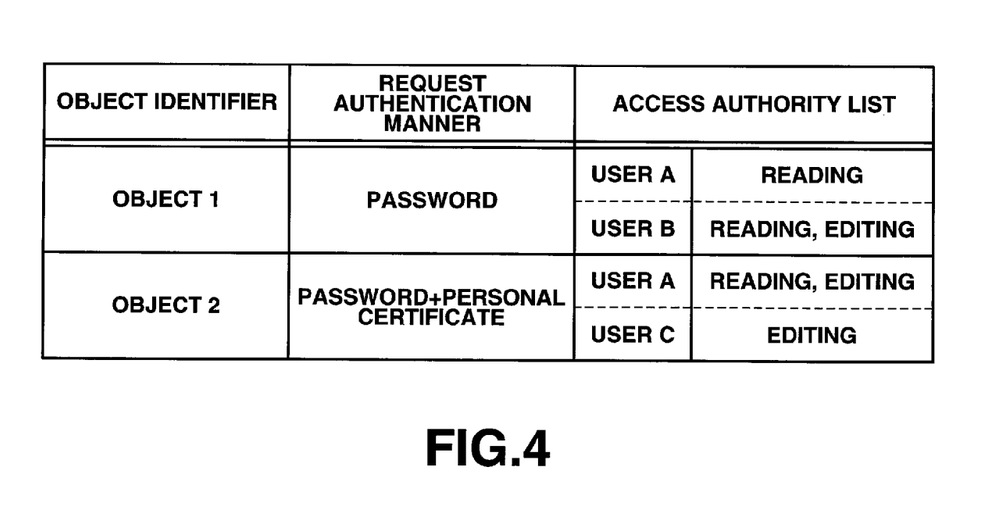
FIG. 4 is a figure showing one example of the table configuration of an authentication manner management table.

The authentication manner management section 28 performs the function of managing the authentication manner required for accessing a particular information object. For management of the authentication manner which is required (hereinafter, to be referred to as the required authentication manner), an authentication manner management table as shown in FIG. 4, for example, is used. In the authentication manner management table, the required authentication manner indicating one or more authentication manners that are required for accessing the pertinent object, and the access authority list are managed in correspondence with the object identifier that provides information for identifying a particular information object. In the access authority list, the type of access that is permitted for each particular user (that may be a particular group enclosing the prescribed users) is defined. In this case, for accessing the object 1, authentication by password is required, while, for accessing the object 2, authentication by password and personal certificate is required.

The accessibility determination section 29 performs the function of, at the time of access to an information object, determining whether the information object is accessible or not. Determination of the accessibility is performed on the basis of the logged-in information management table (see FIG. 3) and the authentication manner management table (see FIG. 4). In other words, whether the information object is accessible or not is determined on the basis of the one or more required authentication manners corresponding to the information object (the authentication manner management table), and the authentication success information (the logged-in information management table).

The access control section 30 performs the function of controlling the access to the information object on the basis of the result of the determination by the accessibility determination section 29. Specifically, in a case where the accessibility determination section 29 determines that the information object is not accessible, the access authority is not granted, resulting in the pertinent access being forbidden. In a case where the accessibility determination section 29 determines that it is accessible, the access authority is granted, resulting in the pertinent access being permitted.

The processing execution section 31 performs the function of executing the processing in accordance with the access from the client 10. In a case where it is determined that the pertinent access is not provided with access authority, the above-described access control section 30 forbids the processing by the processing execution section 31.

These are the descriptions of the configuration of the authentication processing system as shown in FIG. 1. The client 10 and the information processing server 20 described above include a CPU (Central Processing Unit) and the like, as a main control section; a display and the like, as an output section; a keyboard, mouse and the like, as an input section; an HDD (Hard Disk Drive) and the like, as an external storage section; and an ROM (Read Only Memory), an RAM (Random Access Memory) or the like, as a main storage section, each of which is connected to a bus. Each of these components is controlled by the program stored in the external storage section being executed by the main control section.

Next, the operation of the authentication processing system as described above using FIG. 1 will be described.

Figure 5:
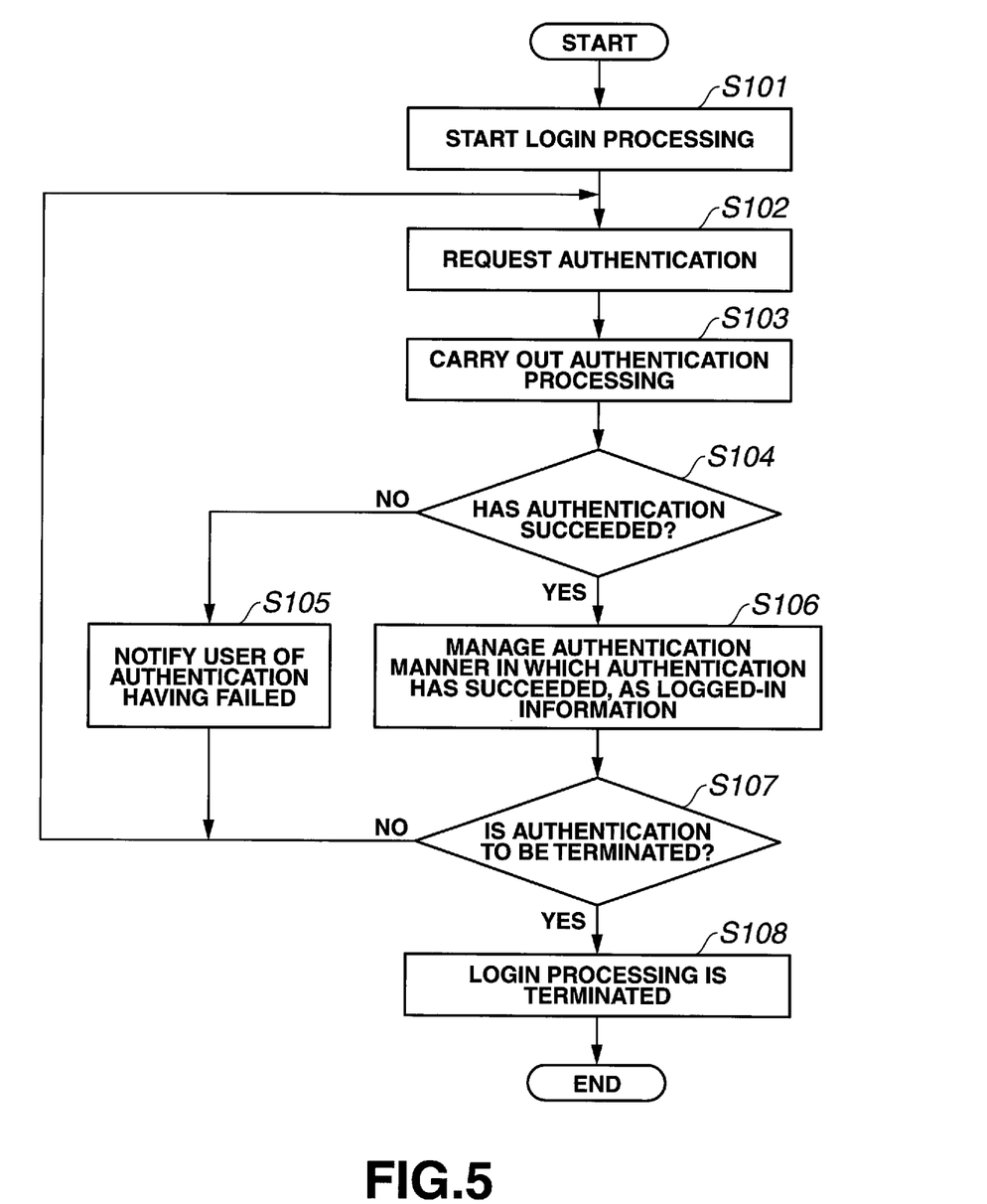
FIG. 5 is a flowchart illustrating one example of a first operation of the authentication processing system as shown in FIG. 1.

First, one example of the flow of operation when the user logs in to the information processing server 20 from the client 10 will be described with reference to FIG. 5.

When the login processing is started (step S101), the information processing server 20 causes the authentication request section 21 to request authentication of the user who uses the client 10 (step S102). When the user who receives this request selects any one of the authentication manners provided by the information processing server 20 to perform authentication, the authentication information is received by the authentication reception section 11 at the client 10, and then sent to the information processing server 20.

Then, the information processing server 20 that receives the authentication information causes the authentication processing section 22 to perform authentication on the basis of the pertinent authentication information (step S103). As a result of the authentication, in a case where, for such reason as the authentication information being illegal, the authentication fails (NO at step S104), the user is notified of the failure (step S105), the program being returned to step S102, and again, authentication being requested. In a case where the user gives an instruction for halting the authentication processing, this processing will be terminated without returning to step S102.

In a case where the authentication succeeds (YES at step S104), the logged-in information storage processing section 24, which is notified of the success, stores in the logged-in information management section 25 the authentication success information indicating the authentication manner in which the pertinent authentication succeeds and the logged-in information prepared by corresponding to the user identifier of the pertinent user (step S106). Thereby, in the logged-in information management table as described above using FIG. 3, the user identifier and the authentication success information are managed in correspondence with each other.

Herein, in a case where the user is further instructed to additionally perform authentication in another authentication manner (NO at step S107), the processing from step S102 to step S106 is again executed. However, in a case where the user is notified that the authentication is to be terminated (YES at step S107), the login processing is terminated (step S108), and then this processing is terminated.

Figure 6:
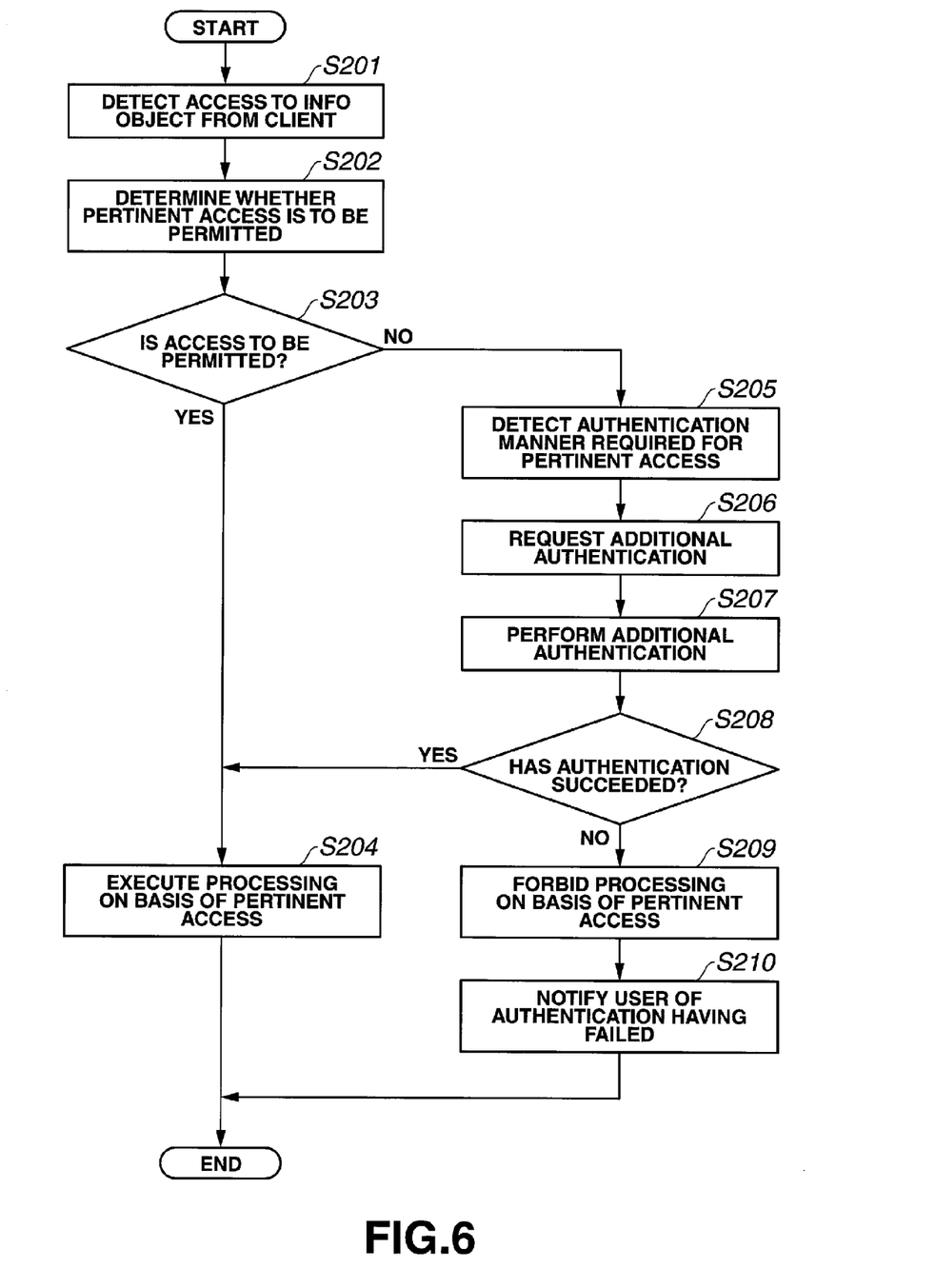
FIG. 6 is a flowchart illustrating one example of a second operation of the authentication processing system as shown in FIG. 1.

Next, one example of the flow of operation when the user accesses the information object will be described with reference to FIG. 6.

When the user who completes logging-in tries from the client 10 to access a particular information object which is under management by the information processing server 20, the information processing server 20 detects the access (step S201).

With the information processing server 20 that detects this access, the accessibility determination section 29 determines whether the pertinent access to the pertinent information object is to be permitted (step S202). As a result of the determination, in a case where the authority to access the information object is granted (YES at step S203), the access to the pertinent information object is permitted, and the processing execution section 31 executes processing on the basis of the pertinent access (step S204), while, in a case where the authority to access the information object is not granted (NO at step S203), the authentication request section 21 which is noticed of it detects the authentication manner required for the pertinent access (step S205), and requests an additional authentication in the pertinent detected authentication manner of the user (step S206). This additional authentication will be specifically described as follows, using the information managed in the authentication manner management table as described above using FIG. 4. In a case where the user A who completes only the password authentication accesses the object 2, such an additional authentication is requested. In this particular case, authentication by personal certificate is additionally requested.

When the user who is requested to make additional authentication performs authentication in the pertinent authentication manner requested, the authentication processing section 21 performs authentication on the basis of the pertinent authentication information (step S207). In a case where there are plural types of authentication required to obtain the access authority, additional authentication is requested plural times according thereto.

Herein, in a case where the authentication at step S207 succeeds (YES at step S208), the authentication success information indicating that the authentication in the pertinent authentication manner succeeds is additionally stored in the logged-in information management section 25, and the same processing as described above is executed on the basis of the pertinent access (step S204). However, in a case where the authentication fails (NO at step S208), the access control section 30 forbids the processing on the basis of the pertinent access (step S209), notifying the user of the failure of the authentication (step S210). Thereafter, this processing is terminated.

Next, the flow of operation when the authentication success information is disabled will be described. Herein, a description will be made of an application where the authentication success information is disabled on the basis of an instruction from the user, and an application where an expiry date is provided for each particular authentication manner and the authentication success information is automatically disabled after the pertinent expiry date elapses.

Figure 7:
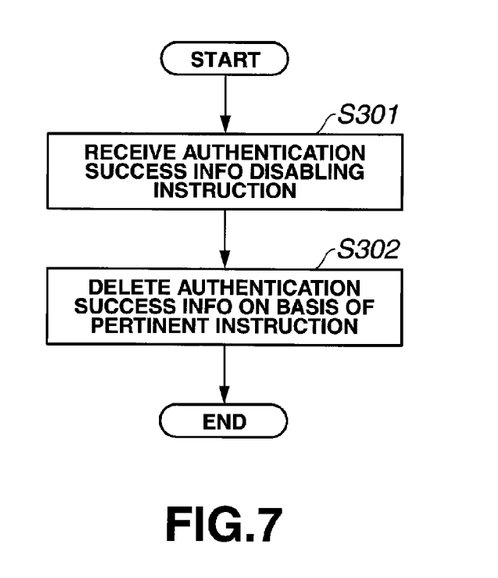
FIG. 7 is a flowchart illustrating one example of a third operation of the authentication processing system as shown in FIG. 1.

First, one example of the flow of operation when the authentication success information is disabled on the basis of an instruction from the user will be described with reference to FIG. 7.

When the user selects authentication success information from the client 10 and gives an instruction for disabling the pertinent authentication success information, the pertinent disabling instruction is sent to the information processing server 20. The information processing server 20 which receives this instruction causes the authentication success information disabling processing section 26 to delete the authentication success information on the basis of the pertinent instruction (step S301, step S302).

Figure 8:
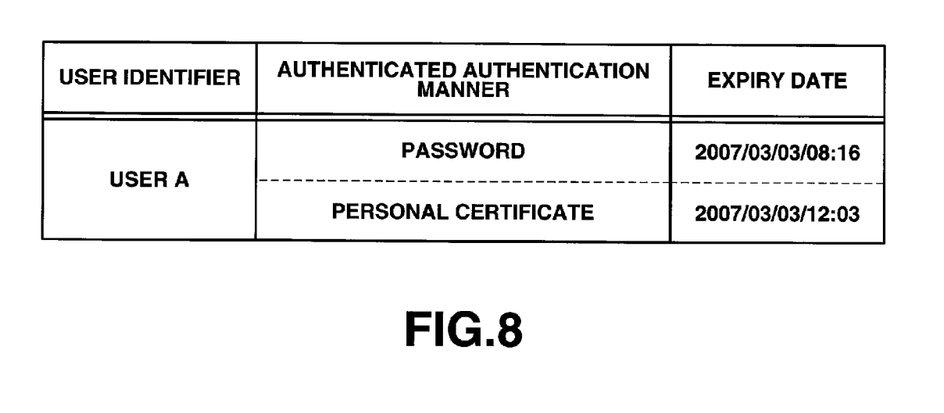
FIG. 8 is a figure showing one example of modification of the table configuration of the logged-in information management table.
Figure 9:
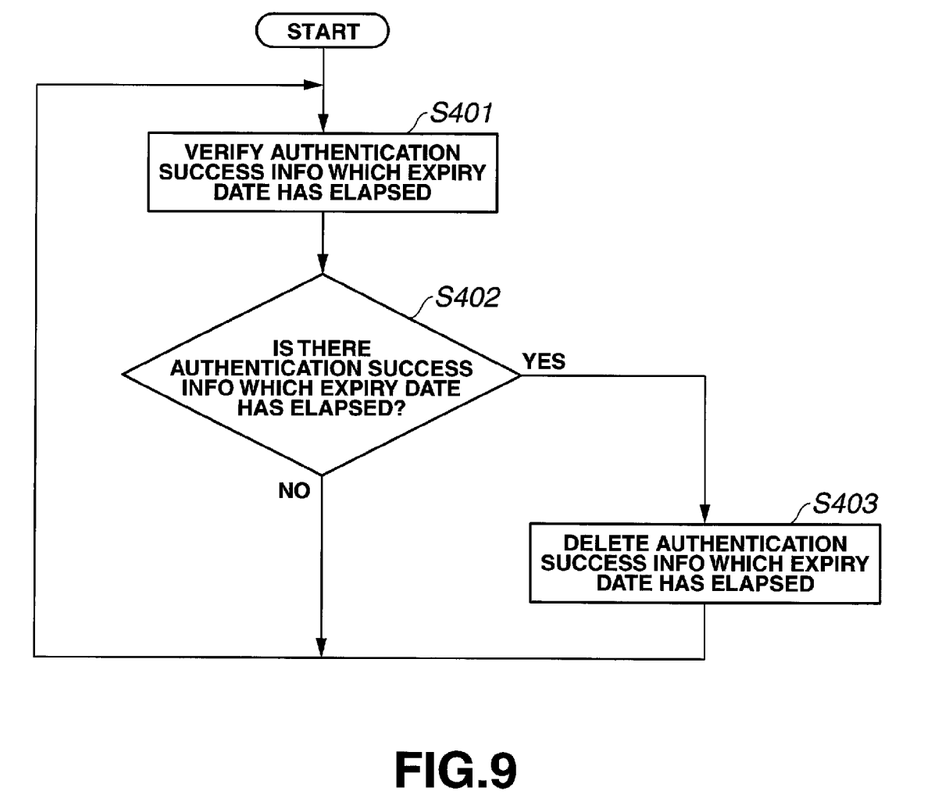
FIG. 9 is a flowchart illustrating one example of a fourth operation of the authentication processing system as shown in FIG. 1.

Next, a case where the authentication success information is disabled on the basis of the expiry date will be described with reference to FIG. 8 and FIG. 9.

In the case where the authentication success information is disabled on the basis of the expiry date, it is necessary to change the above-described configuration of the information processing server 20. Thus, the matter concerning such change will be described herein prior to description concerning the operation. Such configuration change lies in the configuration of the logged-in information management table which is managed by the logged-in information management section 25. In this case, the logged-in information management table as shown in FIG. 8 is used as an example. In the logged-in information management table as shown in FIG. 8, the expiry date is additionally provided in correspondence with the authentication success information. The expiry date is determined on the basis of a prescribed term of validity which is previously provided for each particular authentication manner.

Herein, one example of the flow of operation when the authentication success information is disabled on the basis of the expiry date will be described with reference to FIG. 9.

The information processing server 20 causes the authentication success information disabling processing section 26 to reference the logged-in information management table for verification of the authentication success information which expiry date elapses (step S401).

As a result of the verification, when there is no pieces of authentication success information which expiry date elapses (NO at step S402), the verification processing at step S401 is again executed, while, when there is a piece of authentication success information which expiry date elapses (YES at step S402), the pertinent authentication success information is deleted (step S403), which is followed by the verification processing at step S401 being again executed.

Figure 10A:
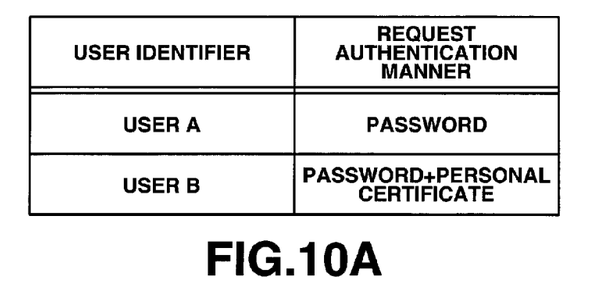
FIG. 10A to FIG. 10D are figures showing one example of modification of the table configuration of the authentication level management table, respectively.
Figure 10B:
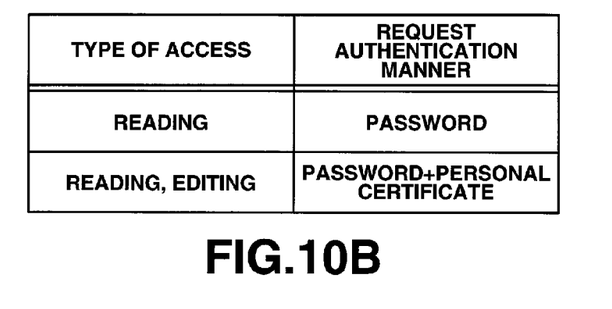
Figure 10C:
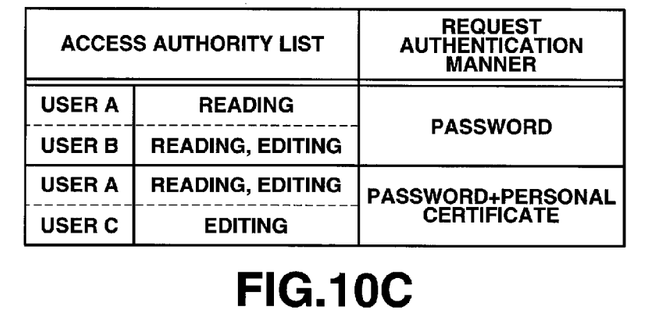
Figure 10D:
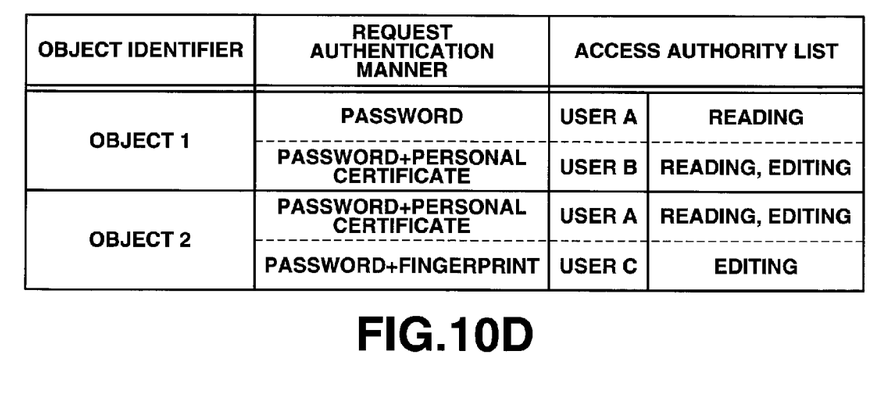

These are the descriptions of First Example. It should be noted that, in the authentication manner management table described in First Example (see FIG. 4), only the required authentication manner is managed in correspondence with the information object. However, the configuration is not limited to this, and it may be possible to control the access by changing this table configuration. For example, as shown in FIG. 10 A, the access may be controlled by managing the authentication manner required for each of the users. As another example, as shown in FIG. 10B, the access may be controlled by managing the authentication manner required for each of the types of the access. As another example, as shown in FIG. 10C, the access may be controlled by managing the authentication manner required for each of the access authorization lists. As another example, as shown in FIG. 10D, the access may be controlled by managing the authentication manner required for both of the information object and the access authorization list. As one example of the access control, a description will be made for a case where the access is controlled by using the table described with reference to FIG. 10B at the time of ATM of banks or online account. In this case, the authentication by password is required for the access to check the balance of his/her account. When the authentication is successfully completed, the control for the process of checking the balance of the account is performed. Additionally, the authentication by password and fingerprints is required for the access to transfer the money. And when the authentication is successfully completed, the control for the process of transferring the money is performed.

Second Example

Next, Second Example will be described. In Second Example, a description will be made of an application where, for each particular authentication manner, an authentication level is provided, and access control is performed on the basis of the pertinent authentication level.

Figure 11:
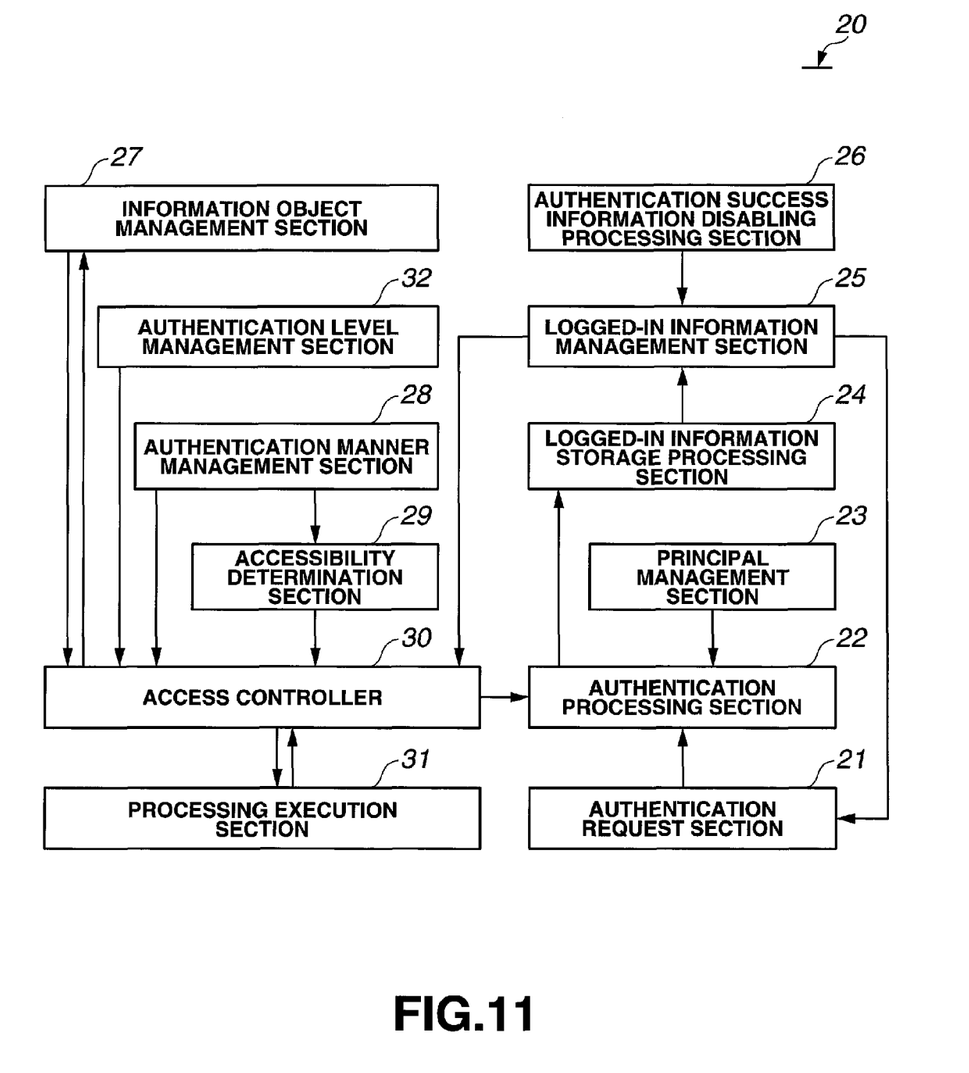
FIG. 11 is a figure showing a part of an example of the functional configuration of the information processing server 20 pertaining to Second Example.

Herein, a part of an example of the functional configuration of the information processing server 20 pertaining to Second Example will be described with reference to FIG. 11. For some of the components that are provided with the same numerals as those with which First Example is described using FIG. 2 above, description is omitted because of the same component.

As the functional configuration, the information processing server 20 includes an authentication request section 21; an authentication processing section 22; a principal management section 23; a logged-in information storage processing section 24; a logged-in information management section 25; an authentication success information disabling processing section 26; an information object management section 27; an authentication manner management section 28; an accessibility determination section 29; an access control section 30; a processing execution section 31; and an authentication level management section 32.

Figure 12:
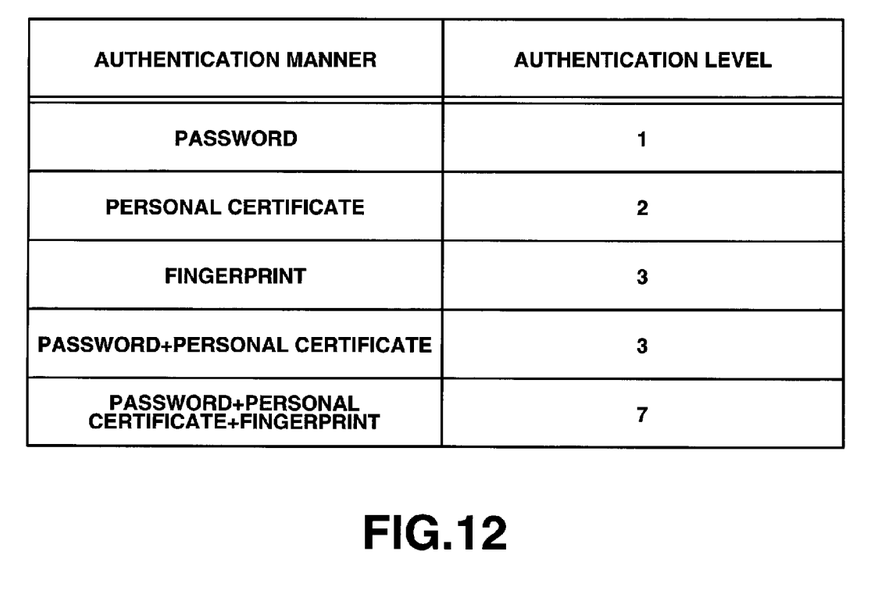
FIG. 12 is a figure showing one example of the table configuration of the authentication level management table pertaining to Second Example.

The authentication level management section 32 performs the function of managing the authentication levels provided for the respective authentication manners. For management of the authentication levels, the authentication level management table as shown in FIG. 12, for example, is used. In the authentication level management table, the authentication level is managed in correspondence with a particular authentication manner. In a case where plural authentication manners are combined with one another, the authentication levels provided for the respective authentication manners are added to one another. In this case, the higher the numerical value of the authentication level, the higher the access authority will be obtained. In other words, for password authentication, an authentication level of 1 is provided; for personal certificate authentication, an authentication level of 2 is provided; for fingerprint authentication, an authentication level 3 is provided; for authentication by a combination of password with personal certificate, an authentication level of 3 is provided; and for authentication by a combination of password, personal certificate, and fingerprint with one another, an authentication level of 7 is provided.

Figure 13:
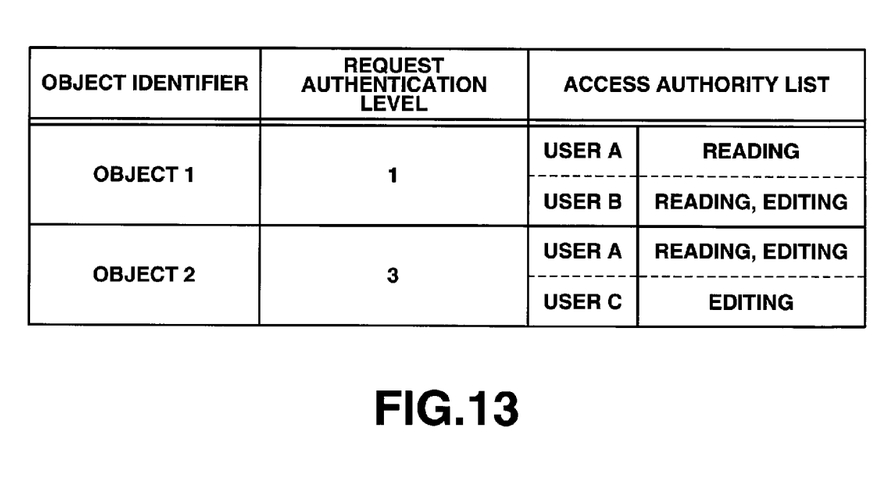
FIG. 13 is a figure showing one example of the table configuration of the authentication manner management table pertaining to Second Example.
Figure 14:
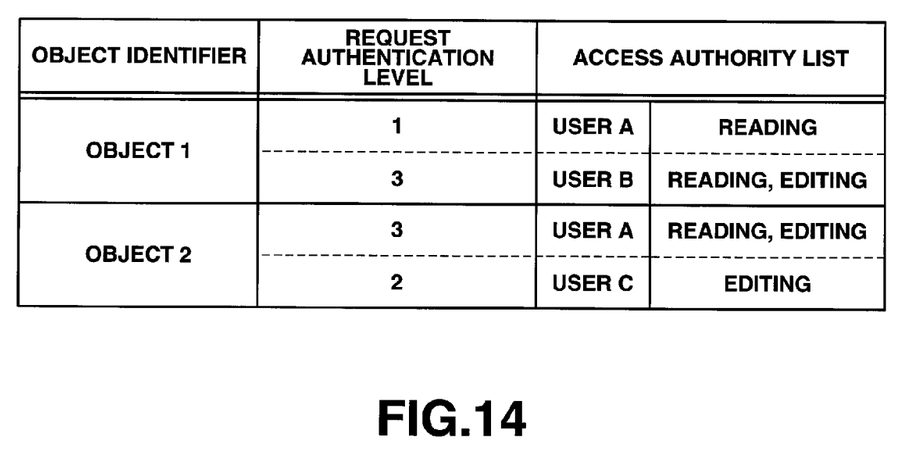
FIG. 14 is a figure showing one example of modification of the table configuration of the authentication level management table pertaining to Second Example.

In addition, along with this, the table configuration of the authentication manner management table which is under management by the authentication manner management section 28 is changed into the configuration as shown in FIG. 13, for example. In other words, in place of the required authentication manner, the required authentication level is managed. In this case, the managed information is information to the effect that authentication by password, or the like, which provides an authentication level of 1, is required for accessing the object 1; and authentication by fingerprint, or authentication by a combination of password with personal certificate, which provides an authentication level of 3, is required for accessing the object 2. Since obtaining an authentication level of 3 or higher is required for accessing the object 2, such accessing is permitted by the authentication with a combination of password, personal certificate and fingerprints. The table configuration of the authentication manner management table in Second Example can, of course, be changed in the same way as that in First Example above. For example, as shown in FIG. 14, the required authentication level may be managed with respect to the information object and the access authority list. In this case, once the user A performs password authentication, the user A can read the object 1. On the other hand, in a case of the user B, even if the user B performs password authentication, the user B cannot read the object 1. In order for the user B to be able to read the object 1, the user B must satisfy the requirement of authentication level 3, thus the user B must additionally perform authentication by personal certificate or fingerprint.

Determination of accessibility by the accessibility determination section 29 is performed on the basis of the logged-in information management table as described with FIG. 3 above, the authentication level management table as described with FIG. 12, and the authentication manner management table as described with FIG. 13.

These are the description of Second Example. Basically, the operation of the authentication processing system in Second Example is substantially the same as that in First Example, thus the description thereof is omitted.

Hereinabove has been described one example of a typical embodiment of the present invention. However, the present invention is not limited to the exemplary embodiments as described above and illustrated in the drawings, and may be appropriately modified for embodiment without departing from the spirit and scope thereof.

For example, in the above exemplary embodiments, the information management server 20 performs authentication, but the configuration is not limited to this. An SSO (Single Sign-On) system may be introduced for performing authentication, or an application program in the client 10 may be used for performing authentication.

In addition, the system may be configured such that the processing by the information processing server 20 described above is executed using a program installed in the computer. This program can, of course, be provided through such communication means as a network, and also can be supplied, being recorded in such medium as a CD-ROM.

The foregoing description of the exemplary embodiments of the present invention is provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An authentication processing apparatus, comprising at least one hardware processor configured to execute:
   performing authentication using an authentication method selected from a plurality of authentication methods provided;
   storing authentication information indicating whether or not the authentication is valid;
   when electronic information associated with one or more required authentication methods among the plurality of authentication methods is accessed, determining whether the access of the electronic information is permitted or not, on the basis of the stored authentication information and the one or more required authentication methods associated with the electronic information; and
   in response to determining that the access of the electronic information is not permitted, detecting from among the one or more required authentication methods associated with the electronic information an authentication method for which the stored authentication information indicates that an authentication is invalid, and requesting the authentication using the detected authentication method.

2. The authentication processing apparatus of claim 1, wherein the at least one hardware processor determines whether the operation on the electronic information is permitted or not, further based on at least one of:
   an operator who requests the operation on the electronic information; and
   a type of the operation on the electronic information.

3. The authentication processing apparatus of claim 1, wherein the at least one hardware processor further configured to execute:
   when an authentication that succeeded is invalidated in accordance with an instruction from an operator, updating the authentication information to indicate that the authentication is invalid.

4. The authentication processing apparatus of claim 2, wherein the at least one hardware processor further configured to execute:
   when an authentication that succeeded is invalidated in accordance with an instruction from an operator, updating the authentication information to indicate that the authentication is invalid.

5. The authentication processing apparatus of claim 1, wherein
   each of the plurality of authentication methods has an expiry date for a performed authentication, and
   the wherein the at least one hardware processor further configured to execute:
      when an authentication reaches an expiry date, updating the authentication information to indicate that the authentication is invalid.

6. The authentication processing apparatus of claim 2, wherein
   each of the plurality of authentication methods has an expiry date for a performed authentication, and
   wherein the at least one hardware processor further configured to execute:
      when an authentication reaches an expiry date, updating the authentication information to indicate that the authentication is invalid.

7. The authentication processing apparatus of claim 3, wherein
   each of the plurality of authentication methods has an expiry date for a performed authentication, and
   wherein the at least one hardware processor further configured to execute:
      when an authentication reaches an expiry date, updating the authentication information to indicate that the authentication is invalid.

8. The authentication processing apparatus of claim 4, wherein each of the plurality of authentication methods has an expiry date for a performed authentication, and wherein the at least one hardware processor further configured to execute:

when an authentication reaches an expiry date, updating the authentication information to indicate that the authentication is invalid.

9. An authentication processing method, comprising:

performing authentication using an authentication method selected from among a plurality of authentication methods provided;

storing authentication information indicating whether or not the authentication is valid;

determining, using a hardware processor, when electronic information associated with one or more required authentication methods among the plurality of authentication methods is accessed, whether the access of the electronic information is permitted or not, on the basis of the stored authentication information and the one or more required authentication methods associated with the electronic information;

detecting, when it is determined that the access of the electronic information is not permitted, from among the one or more required authentication methods associated with the electronic information, an authentication method for which the authentication information indicates that an authentication is invalid; and requesting the authentication using the detected authentication method.

10. A non-transitory computer readable recording medium storing an authentication processing program for causing a computer to execute a process, the process comprising:

performing authentication using an authentication method selected from among a plurality of authentication methods provided;

storing authentication information indicating whether or not the authentication is valid;

determining, when electronic information associated with one or more required authentication methods among the plurality of authentication methods is accessed, whether the access of the electronic information is permitted or not, on the basis of the stored authentication information and the one or more required authentication methods associated with the electronic information;

detecting, when it is determined that the access of the electronic information is not permitted, from among the one or more required authentication methods associated with the electronic information, an authentication method for which the authentication information indicates that an authentication is invalid; and requesting authentication using the detected authentication method.

11. A non-transitory computer readable recording medium storing an information processing program for causing a computer to execute a process, the process comprising:

performing authentication using an authentication method selected from among a plurality of authentication methods provided;

storing authentication information indicating whether or not the authentication is valid;

executing processing according to a processing request and corresponding to one or more required authentication methods among the plurality of authentication methods;

determining, when the processing is executed, whether execution of the processing is permitted on the basis of the stored authentication information and the one or more required authentication methods associated with the processing;

detecting, when it is determined that execution of the processing is not permitted, from among the one or more required authentication methods associated with the processing, an authentication method for which the authentication information indicates that the authentication is invalid; and requesting authentication using the detected authentication method.

12. An information processing system, comprising at least one hardware processor configured to execute:

storing electronic information associated with one or more required authentication methods from among a plurality of authentication methods provided;

performing authentication using an authentication method selected from the plurality of authentication methods provided;

storing authentication information indicating whether or not the authentication is valid;

when the electronic information stored in the electronic information storage section is accessed, determining whether the access of the electronic information is permitted or not, on the basis of the stored authentication information and the one or more required authentication methods associated with the electronic information; and in response to determining that the access of the electronic information is not permitted, detecting from among the one or more required authentication methods associated with the electronic information an authentication method for which the stored authentication information indicates that an authentication is invalid, and requesting authentication using the detected authentication method.

13. An information processing system, comprising at least one hardware processor configured to execute:

performing authentication using an authentication method selected from among a plurality of authentication methods provided;

storing authentication information indicating whether or not the authentication is valid;

executing processing according to a processing request and associated with one or more required authentication methods from among the plurality of authentication methods;

when the processing is executed, determining whether the execution of the processing is permitted or not, on the basis of the stored authentication information and the one or more required authentication methods associated with the processing; and in response to determining that execution of the processing is not permitted, detecting from among the one or more required authentication methods associated with the processing an authentication method for which the stored authentication information indicates that an authentication is invalid, and requesting authentication using the detected authentication method.

14. An authentication processing apparatus, comprising at least one hardware processor configured to execute:

performing one or more authentications using one or more authentication methods selected from a plurality of authentication methods provided;

storing authentication information indicating whether or not each of the one or more authentications is valid;

determining a user authentication level using the stored authentication information by summing authentication levels associated with authentications that are valid among the one or more authentications, and, when electronic information associated with a required authentication level is accessed, determining whether the access of the electronic information is permitted or not, on the basis of the user authentication level and the required authentication level associated with the electronic information; and in response to determining that the access of the electronic information is not permitted, detecting from among the plurality of authentication methods provided an authentication method for which the stored authentication information indicates that an authentication is invalid, and requesting authentication using the detected authentication method.

* * * * *